Figure 1:
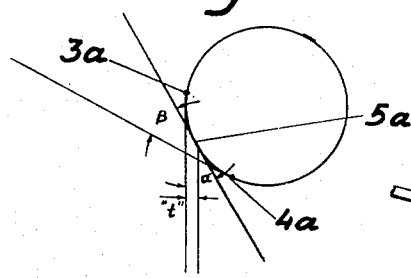

Nov. 20, 1951   E. B. WESTERBERG   2,575,935
MEASURING INSTRUMENT
Filed Feb. 27, 1948

INVENTOR
ERIK BERNHARD WESTERBERG
by Otto Munk
HIS ATTY

Patented Nov. 20, 1951

2,575,935

UNITED STATES PATENT OFFICE 2,575,935

MEASURING INSTRUMENT

Erik Bernhard Westerberg, Ensta, Enebyberg, Sweden

Application February 27, 1948, Serial No. 11,479
In Sweden December 12, 1946

Section 1, Public Law 690, August 8, 1946
Patent expires December 12, 1966

4 Claims. (Cl. 74—95)

Modern industry is, nowadays, to a very great degree, organized to manufacture its products according to the standard tolerance system now existing. The result is that more and more industries have been forced to increase their equipment with such measuring instruments which, in the most satisfactory and economical manner, make possible a control so that the fixed tolerances, of the manufactured products, are not exceeded.

The present invention relates to a similar instrument which is based on relative measuring, and requires, for its handling, less measuring experience and judgment on the part of the employees.

The subject of the invention is an indicating instrument with adjustable tolerance limits and by which one can determine if the product being measured comes within the allowable limits or not.

The indication instruments, which are at present at the disposal of industry for the purposes mentioned are all characterized by the state of tolerance being registered by an indicator, which registers on a graduated scale. For a smaller tolerance the indicator will register a smaller deflection, and for a larger tolerance quarter a greater deflection. This means that an indicating instrument of the common type, which has a scale graduated in fixed units, will allow, to a smaller degree of precision, the reading of smaller tolerances, whereas greater tolerances can be read with greater precision. The opposite would be preferable, because the smaller the tolerance to be determined, the more important it is that deviations be more accurately determined.

An indicating instrument, without the above mentioned disadvantages should offer the following, namely that:

1. The indicator gives a constant and accurately balanced deflection, regardless of the scope of the tolerance.

2. It should be possible, with the same degree of precision, to read the deflection of every tolerance, which the instrument may embrace.

3. The instrument affords different and adjustable gear-ratio readings.

4. The instrument affords the alteration of the measuring pressure in accordance with the case for which measuring is done.

5. The position of the scale, in comparison to the line of sight, is as conveniently as possible placed, and the pointer is formed, in such a manner, that the reading of the main result of the measurement can occur at a convenient and suitable distance, as well as the possibility of a very precise reading in doubtful cases.

6. The mechanism of the instrument is, as far as possible, free from movable parts, as well as operable at a minimum loss of friction, so that any drag or jittery conditions, i. e. hysteresis, may be avoided and that the mechanism is free from such wear which may prove injurious to the instrument, from the point of accuracy.

7. The instrument is, as far as possible, immune to external disturbances, so that its function cannot be jeopardized in normal usage.

According to the invention the indicator is fixed to a cylinder, at the periphery of which three ribbons or wires are attached, one of which is wound around the cylinder in the opposite direction to that of the other two ribbons and connected to a spring actuated measuring unit, for example a measuring piston. Another ribbon is, through a spring, fitted directly or indirectly to the instrument frame and the third ribbon, which may be divided into two ribbons one on each side of the other bands, is fitted, directly, or indirectly, to the measuring instrument frame.

Figure 3:
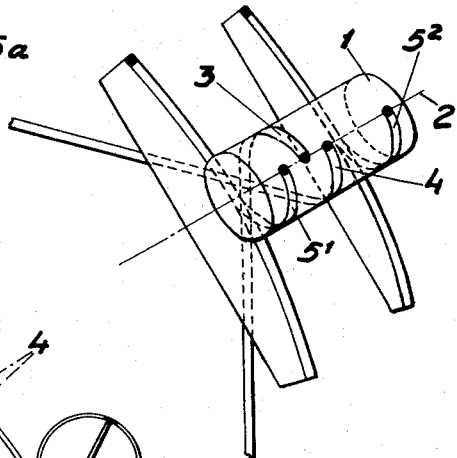
Figure 2:
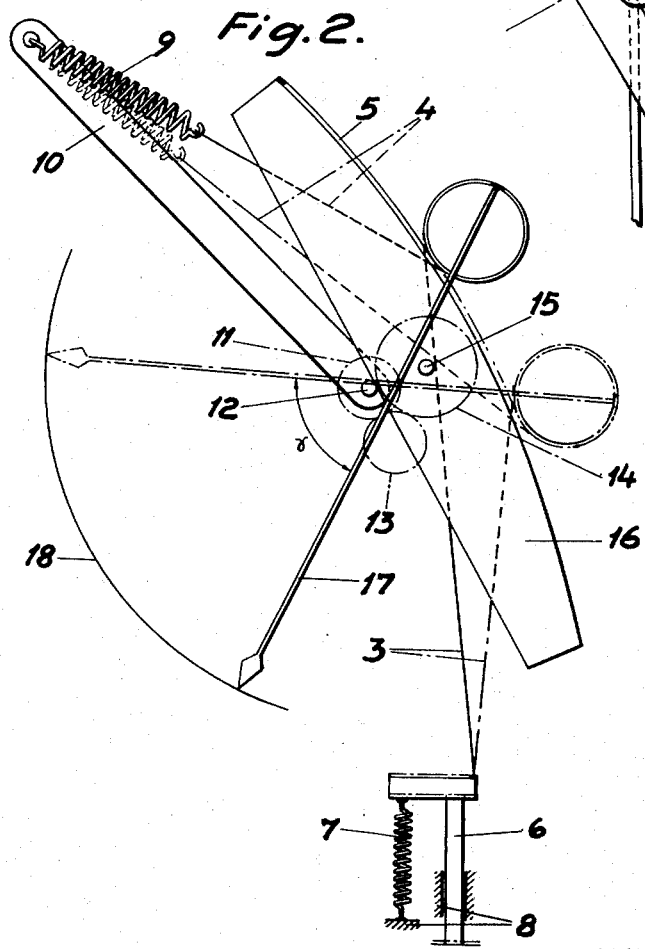

The invention is explained in the attached drawing, wherein Fig. 1 diagrammatically shows the principle of the operation of the instrument. Fig. 2 shows diagrammatically an embodiment of the invention subject matter and Fig. 3 shows a detail.

In the drawing, reference number 1 indicates a cylinder, onto which along a common generatrix 2, three ribbons 3, 4, 5 are fixed by one of their respective ends, of which the last ribbon, for the sake of balance 15 is divided into two parallel ribbons, $5^1$, $5^2$. The ribbon 3 is wound around the cylinder 1 in the opposite direction of the ribbons 4:5 and its other end is fixed to a measuring piston 6, which is actuated on by a spring 7, fixed to the frame of the instrument 8. The other end of the ribbon 4, is, by means of a screw spring 9, fixed to a ribbon holder 10 which is attached to a toothed wheel 11 which is rotatably mounted on a spindle 12, journalled in the frame of the instrument. The tooth wheel 11 is in mesh with a tooth-wheel 13, which is in mesh with a tooth-wheel 14, said wheel being fixed to a spindle 15 journalled in the frame. The tooth-wheel 14 has twice the number of teeth as the tooth-wheel 11. The ribbon 5 ($5^1$, $5^2$) is, at its other end, attached to one of the ends of a convex cam 16, on which the cylinder 1 can roll. The cam 16 is fixed to the spindle 15. A pointer 17 is radially fixed on the cylinder, which runs along a scale 18. The tangent points of the ribbons and the cylinder 1 are marked 3a, 4a, 5a (see Fig. 1). The point 5a constitutes at the same time the tangent point between the cylinder 1 and the cam 16.

If the measuring piston 6 is subjected to an upward driving power, it will be urged upwards against the pull of the spring 7 and the ribbon 3 will be released, whereby the spring 9, through the ribbon 4, turns the cylinder 1 and restores the balance of the system. Thereby the cylinder 1 moves the distance A—B, due to its rolling on the cam 16 from A to the position B (for the sake of easier comprehension, the movement is shown in an exaggerated way in Figure 2). The pointer 17 fixed to the cylinder 1 thereby swings at an angle $a$ which naturally stands in relation to the movement of the measuring piston 6. As the distance alone determines the relation between the angle movement of the pointer and the movement of the measuring piston, this relation can be accomplished by altering said distance, which in turn, is made possible by altering the inclination of the cam, the angle $a$ in relation to the direction of the ribbon 3, and installed in such a manner that the pointer through different displacements of the measuring piston 6 makes identical deflections. In such a way the conditions according to 1, 2 and 3 are satisfied.

By making the tension of the spring 7 adjustable, it is possible to alter the measuring pressure due to the fact that, if the tension of the spring is altered, a similar alteration of the pressure against the measuring piston 6 is also required in order to set the system in motion.

To maintain the established measuring pressure at different ratios, the angle $a$, between the cam 16 and the ribbon 3, must be the same as the angle B, between the cam 16 and the direction of the ribbon 4. This is accomplished, by swinging the ribbon lever 10 compulsory at the same time as the cam 16, but at twice the angle as that of the cam.

To maintain a continual ratio during the whole time the pointer 17 is registering, it is necessary that the angle remains constant, when the cylinder 1 is rolling over the cam 16, which is not the case, if the cam is straight. For this reason, the cam is curved, so that the angle $a$ remains constant.

The instrument, in the described manner, therefore meets the conditions in 4, 5, 6 and 7.

Having now described my invention, what I claim as new and desire to secure by Letters Patent is:

1. A measuring instrument comprising a frame for the measuring instrument, a fixed cam carried by the said frame, a cylinder, a swinging pointer thereto affixed, four ribbons, one respective end of each being attached to said cylinder, one of the ribbons being positioned around said cylinder in a direction opposite that of the other ribbons, a spring, a measuring device displaceable against the actuation of said spring, the other end of the ribbon being fixed to said measuring device, a second spring, the other end of the second ribbon being fixed by means of said second spring to a part carried by the frame of the instrument, and the other ends of the third and fourth ribbons being fixed to said cam.

2. A measuring instrument according to claim 1 in which the cylinder is adapted to roll on said fixed cam.

3. A measuring instrument according to claim 1, in which the cylinder is adapted to roll on said fixed cam, and the angular position of the cam being adjustable to the ribbons.

4. A measuring instrument according to claim 1 in which the cylinder is adapted to roll on said fixed cam, and including a spindle, and a ribbon holder adjustable around the same spindle.

ERIK BERNHARD WESTERBERG.

REFERENCES CITED

The following references are of record in the file of this patent:

UNITED STATES PATENTS

| Number | Name | Date |
| --- | --- | --- |
| 359,145 | Flack | Mar. 8, 1887 |
| 562,124 | Doolittle | June 16, 1896 |
| 1,116,814 | Goodline | Nov. 10, 1914 |
| 2,149,216 | Gravley | Feb. 28, 1939 |

FOREIGN PATENTS

| Number | Country | Date |
| --- | --- | --- |
| 14,994 | Sweden | Sept. 17, 1901 |